(12) United States Patent
Hewlett et al.

(10) Patent No.: US 6,970,150 B2
(45) Date of Patent: Nov. 29, 2005

(54) CONTROL TIMING FOR SPATIAL LIGHT MODULATOR

(75) Inventors: Gregory J. Hewlett, Richardson, TX (US); Donald B. Doherty, Richardson, TX (US)

(73) Assignee: Texas Instruments Incorporated, Dallas, TX (US)

(*) Notice: Subject to any disclaimer, the term of this patent is extended or adjusted under 35 U.S.C. 154(b) by 470 days.

(21) Appl. No.: 10/102,499

(22) Filed: Mar. 19, 2002

(65) Prior Publication Data

US 2002/0130980 A1   Sep. 19, 2002

Related U.S. Application Data

(60) Provisional application No. 60/277,155, filed on Mar. 19, 2001.

(51) Int. Cl.[7] ............................................. G09G 3/34
(52) U.S. Cl. ....................................... 345/84; 359/223
(58) Field of Search .................. 345/84, 85, 108–110; 359/223, 224; 348/771

(56) References Cited

U.S. PATENT DOCUMENTS 6,201,521 B1 * 3/2001 Doherty ........................ 345/84

FOREIGN PATENT DOCUMENTS

| EP | 0 772 181 A1 | 5/1997 |
| EP | 0 841 815 A2 | 5/1998 |

OTHER PUBLICATIONS

U.S. Appl. No. 09/918,837, filed Jul. 21, 2001, Doherty et al.

* cited by examiner

*Primary Examiner*—Alexander Eisen
(74) *Attorney, Agent, or Firm*—Charles A. Brill; Wade James Brady, III; Frederick J. Telecky, Jr.

(57) ABSTRACT

A spatial light modulator clocking method, called fast-clear, which employs embedded clear hardware in the SLM to enable the fast-clear bit to generate least-significant short-bit periods and without any bit ordering restrictions. In this method, fast data clears 34 are inserted between block data loads 32,36 within a frame refresh period. This method virtually eliminates the artifacts associated with the earlier reset-release timing method without the bit-ordering restriction of the jog-clear method.

13 Claims, 6 Drawing Sheets

CONTROL TIMING FOR SPATIAL LIGHT MODULATOR

CROSS-REFERENCE TO RELATED APPLICATIONS

This application claims priority under 35 USC § 119(e)(1) of provisional application No. 60/277,155 filed Mar. 19, 2001.

Pending patent application Ser. No. 60/221,733 filed Jul. 31, 2000, and entitled "Method for Improved Display Performance with Inserted Block Clears" relates closely to the present invention and is incorporated herein.

FIELD OF THE INVENTION

The present invention relates to spatial light modulator (SLM) projection displays and more specifically to the control timing for improved display performance.

BACKGROUND OF THE INVENTION

To achieve a satisfactory degree of intensity resolution in a display system using pulse width modulation (PWM), some display time periods (bit times) need to be shorter than the time required to reload the pixels of the SLM. To accomplish these short bit times in some SLMS, for example in a digital micromirror device™ (DMD™), rows of modulator elements are portioned or grouped together so that the entire device doesn't have to be loaded at one time. However, in modern systems where the bit times are continuously becoming shorter and shorter, it is possible for the short-bit (bit 0) time to be shorter than even the partitioned block loading time plus mirror settling time.

FIG. 1a is a diagram showing a conventional approach, called reset-release timing, used in a phased system where the block loading time plus the mirror settling time is longer than the bit 0 time. In this approach, at the end of the bit 0 period the mirrors are released to a flat state and held while the next bit is loaded. This is accomplished by turning the mirror bias OFF and allowing them to float around the 0° position. FIG. 1a shows the data to be loaded into memory, the reset timing, and the reflected light response from the mirrors. While the mirrors are in their selected state from normal bit A 100, the reset-release (rr) bit is loaded 101 into memory, but the mirrors are not reset immediately. At the appropriate time (after delay), a reset pulse 102 occurs setting the mirrors 103 according to the rr data in memory. Then at the end of the short bit 0 period, the mirrors are released 104 by turning OFF the mirror bias 105. In the absence of a bias, the mirrors go to a flat state 106 and remain there while data for the next normal bit B 107 is loaded into memory. The bias is then turned back ON 108 and the mirrors assume their bit B positions 109. This approach allows some stray light to get into the lens aperture and cause undesirable artifacts.

FIG. 1b illustrates the timing for the reset-release method of FIG. 1a. This diagram shows a normal bit A being loaded 10 and reset 11, then the reset-release (rr) bit is loaded 12 but not immediately reset in the normal fashion. Then at the appropriate time the rr bit is reset 13, allowing the mirrors to go to their appropriate state, and released 14 at the end of the bit 0 time period, when the mirror bias is turned OFF. Once released, the mirrors go to and remain in a flat (approximately 0°) position while the next bit B is loaded 15. Once loaded, the mirror bias is turned back ON 16 allowing the mirrors to go to their new state (Bit B) at which point the normal sequence of loading 17 and resetting 18 the next bit continues. The problem with the reset-release method is that the flat mirrors lead to additional optical artifacts, such as stray light entering the aperture causing horizontal lines at the reset block boundaries, a "venetian blind" effect across the reset blocks, and lower system contrast due to higher dark levels.

The clocking method of the referenced patent application, Ser. No. 60/221,733, called jog-clear, addressed the needs and shortcomings listing above by turning the mirrors OFF, rather than allowing them to float, while loading the next bit after the short-bit. Solving this short-bit generation time problem is not a trivial matter and in this approach is complicated by the fact that the combination of data and reset operations need to be performed independently on each block in a phased manner. In addition, matters are further complicated by the additional restrictions that a block clear cannot be performed on one block while loading another block. However, the jog-clear method addressed these needs and provided a higher performance solution, albeit with some limitations as to device type and bit ordering. Major advantages of the jog-clear method as described in the referenced application include: (1) elimination of visible lines at block boundaries, (2) elimination of the so-called "venetian blind" effect, and (3) significantly reduced black level.

In the jog-clear method, a block clear is performed during the short bit period (s_time). As a result, instead of a reset-release of the mirrors (with unstable flat mirrors), a clear-reset latches the mirror into the OFF (dark) state for the duration of time it takes to load the memory for the next normal bit. The method centers around the technique used to achieve this dark state for very short periods of time. An aspect of the method is the requirement that the SLM and controller be capable of being cleared with a field of binary zero data generated internal to the device and with multiple row per clear cycle, while not affecting the data in any other reset block.

FIG. 2a is a diagram showing the jog-clear method of the referenced invention for a phased system. Although this looks similar to the reset-release method of FIG. 1a, the difference is that the jog-clear bit is loaded and then the mirrors are cleared to the dark state in phased blocks. FIG. 2a shows the data to be loaded into memory, the reset timing, and the reflected light response from the mirrors. While the mirrors are in their selected state from normal bit A 200, the jog-clear bit is loaded 201 into memory, but the mirrors are not immediately reset. The mirrors are then reset at the appropriate time 202 (after delay) to display 203 the short bit. Then the memory is loaded with clear data (all binary 0's) 204 and a reset pulse 205 clears all the mirrors in a block precisely at the end of the short bit period, forcing all mirrors to the OFF (dark) state 206 while data for the next normal bit B is loaded 208 into memory. Finally, a reset pulse 209 causes the mirrors to go to their normal bit B state 210. Notice in this diagram that during the dark state, while load B 208 is underway, the bias voltage 207 is still applied to the mirrors and since all memory locations are set to binary 0, all mirrors are OFF.

FIG. 2b illustrates the timing for the jog-clear method of FIG. 2a. This diagram shows a normal bit A being loaded 20 and reset 21, then the data for the short bit is loaded 22 but not immediately reset in the normal fashion. Then at the appropriate time this jog-clear bit is reset 23 setting the mirrors to their short bit state. Next, the clearing function is applied to terminate the short bit at the appropriate time. The clear data is loaded 24 and the mirrors reset 25 at the end of the short period, but the mirror bias is still applied so that the mirrors are turned OFF (dark) while bit B is loaded 26 and reset 27. The normal load bit 28 and reset mirrors 29 sequences then continues through the next frame.

The seemingly straightforward process of placing the block clear between two block loads is further complicated by the fact that in micromirror devices used with jog-clear, a clear on one block of data cannot occur while another block is being loaded. Notice in the example shown in the diagram of FIG. 2*b* that when jog-clear in block 6 220 occurs, there is no other activity going on in the device. This mandates a spreading out in time of the DMD block loads, which causes a skew 221 (change in slope) for the short-bit block sequence relative to the slope 222 for a normal-bit block sequence. This change in slope produces times for bit A (from reset 21 to reset 23) that are shorter for first reset blocks (e.g., 0, 1, 2, . . . ) than for later reset blocks (e.g., . . . , 5, 6, 7). Similarly, the times for bit B (from reset 27 to reset 29) are longer for the first reset blocks than for blocks reset later in the cycle. If not corrected, this condition would cause non-uniform weights for bits A and B and thus visible artifacts. This skew is acceptable as long as it is removed elsewhere in the sequence, as it is by the jog-clear method. To remove this skew, the bit-ordering restrictions described below must be applied.

But, the jog-clear method adds bit-ordering restrictions to the system sequence. For example, in a 9-bit system where bits 8 and 9 are normal bits, and bits 0 and 1 are jog-clear bits, one of the following bit sequences must be used:

(1) sandwich skew: 9-0-9; a jog-clear must be surrounded on both sides by the same bit, or
(2) opposite adjacent skew: 9-0-8 . . . 8-9; the bits surrounding the jog clear bit must be adjacent in the opposite order elsewhere in the sequence(s) and must be reset with the same skew as that of the jog-clear bit, or
(3) paired skew: 9-0-8 . . . 8-1-9; the jog-clear bit may be paired with another jog-clear bit, surrounded by the same bits in opposite order.

As FIG. 2*b* shows, inserting block clears between block loads also requires the external manipulation of the DMD row address. For instance, after the load of bit B 26 for block 0, the DMD address must be moved down to block 2 to continue the clear 24 for block 2. After that block clear, the address must be returned to the top of block 1 to continue the load of bit B for block 1. This process, where the DMD address jogs back and forth as the block clears occur, requires both an external control circuit to manage it and a DMD that can respond appropriately. Some DMDs have random row address capability for which the control circuit simply computes the next row address and supplies it to start each block operation. Another class of DMDs can only adjust the row address sequentially forward or backward. The control circuit for these DMDs sets a count direction and directs the DMD to count the number of times necessary to advance the row count to the correct block. Some of these DMDs can advance row addresses in multiple rows per count. The control circuit can use this fast counting mode to decrease the counting time and minimize the skew.

In summary, with the jog-clear method the reset-release and bias-on operations are replaced with simple reset operations to virtually eliminate the artifacts associated with reset-release. However, in this method there can be no conflict between block clears and block loads. In other words, with jog-clear, when one block is loading, no other block can be clearing. Because of this requirement there is an undesirable time skew introduced in the timing, causing significant limitations on bit ordering.

What is needed is a new method that overcomes the problems of reset-release without introducing the jog-clear bit-ordering restrictions. The method of the present invention, called fast-clear, uses embedded-block clear hardware to accomplish this need.

SUMMARY OF THE INVENTION

In its broader aspect, the present invention discloses a SLM PWM clocking method, called fast-clear, which employs embedded clear hardware in the SLM to enable the fast-clear bit, thus eliminating the need for earlier reset-release or jog-clear techniques to generate short-bit periods.

The method of the present invention positions the timing events to:
(1) use the available input bandwidth so as not to have gaps between block loads,
(2) minimize the mirror off time to avoid degrading system brightness, and
(3) provide as short a least-significant-bit (short-bit) as possible for improved resolution.

Short-bit periods are needed for the LSB(s) in PWM devices, such as the DMD, where the memory load and mirror settling times are greater than the short-bit display time. Early techniques such as reset-release were used to generate these short bit periods, but these required that the mirrors be released to the flat state while data for the next normal bit was loaded into memory. This was not desirable since having the mirrors flat even for a short period of time reduces the contrast and brightness of the display system and introduces artifacts in the form of horizontal lines at the block boundaries and generates a "venetian blind" effect across blocks. More recently, the jog-clear method has been used to overcome many of the problems of the reset-release method, but this method introduces a new problem of restrictions on the sequential bit-ordering in the device, which further complicates the timing of the DMD.

The fast-clear method of the present invention overcomes the problems of the reset release method, but without the bit-ordering restrictions of the jog-clear method. In the fast-clear method, each clear occurs a consistent delay after an "associated load" of another block. This delay does not change in a given system and as a result, avoids the skew that is present in the jog-clear method.

According to one embodiment of the present invention, a method of operating a spatial light modulator is provided. The method comprising: loading a first bit of display data into a first block of spatial light modulator elements; resetting the first block of spatial light modulator elements to display the first bit of display data; loading a lower-significance bit of display data into the first block of spatial light modulator elements; resetting the first block of spatial light modulator elements to display the lower-significance bit of display data; loading clear data in the first block of spatial light modulator elements while simultaneously loading display data into a second block of spatial light modulator elements; resetting the first block of spatial light modulator elements to a dark state at the end of a display period corresponding to the lower-significance bit.

According to another embodiment of the present invention, a projection display is provided. The projection display comprising: a light source for producing a beam of light along a first light path; light-condensing optics in the first light path for focusing the beam of light on to the surface of a spatial light modulator; control electronics for receiving image data and providing control signals and display data representing the image data; the spatial light modulator in the first light path for receiving the control signals and display data and for selectively modulating the beam of light in response to display data, the spatial light modulator comprised of an array of modulator elements, the modulator elements grouped into at least two blocks; and a projection lens focusing the modulated light from the spatial light modulator onto an image plane. The control electronics operable to: load the first bit of display data in a first of the blocks, reset the first of the blocks to display loaded data, load clear data in the first block while simultaneously loading display data into another block, and reset the first block to a dark state; and sequentially load the first bit of display data into remaining data blocks, resetting each of the remaining blocks to sequentially display loaded data, loading clear data into each of the remaining blocks while simultaneously loading display data into another block, and resetting each of the remaining blocks to a dark state.

According to another embodiment of the present invention, a micromirror device is provided. The micromirror device comprising: an array of mirror elements logically grouped into blocks; at least one memory cell associated with each element; address circuitry operable to load data into the memory cells associated with each element of a first block; and circuitry operable to clear the memory cells associated with each element in a second block while data is being loaded into the first block.

According to another embodiment of the present invention, a method of operating a spatial light modulator is provided. The method comprising: providing a spatial light modulator comprised of an array of display elements logically grouped into at least two blocks; loading a first bit of display data into a first block of spatial light modulator elements; and clearing a second block of the spatial light modulator elements during loading.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

This invention discloses a spatial light modulator operating method, called fast-clear, for generating the short-bit periods where data clears are inserted within block data loads during a frame refresh period. This method significantly reduces the minimum short bit duration without requiring reset-release methods, thereby eliminating several artifacts associated with such methods, and without the bit-ordering restriction of the earlier jog-clear method. To implement the method of the present invention, a new modulator that is able to clear and load data simultaneously is required.

The method of this patent deals with where to position the associated data loads, relative to this fixed clear time, so that there are no gaps between loads. The process is to calculate how many reset blocks, back from a given associated block, that a clear must occur so that the clear occurs a consistent delay after the start of the associated load of another block. This delay does not change in a given system.

The following is a discussion of the steps involved in the fast-clear method of the present invention.

Figure 1A:
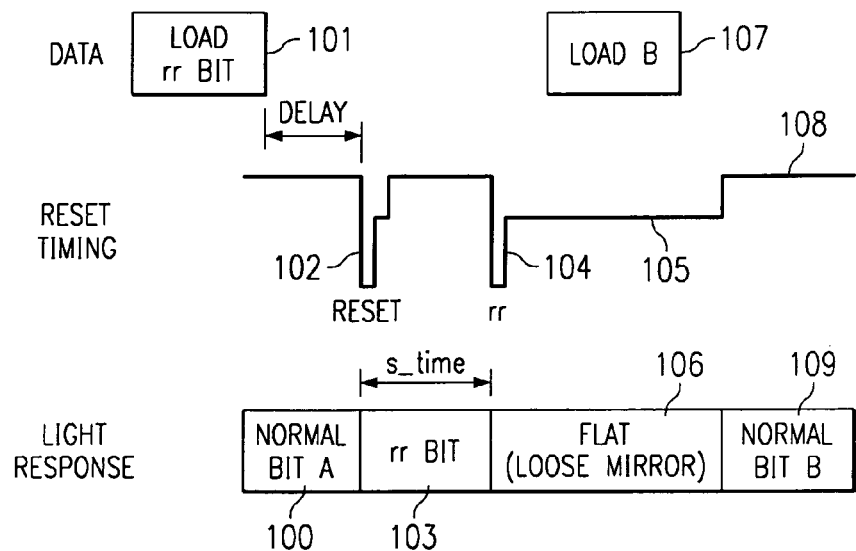
FIG. 1a is a diagram showing a phased DMD operated with the reset-release technique where the mirrors are allowed to float in the flat state during the loading of the next bit after the short LSB bit. (Prior art)
Figure 1B:
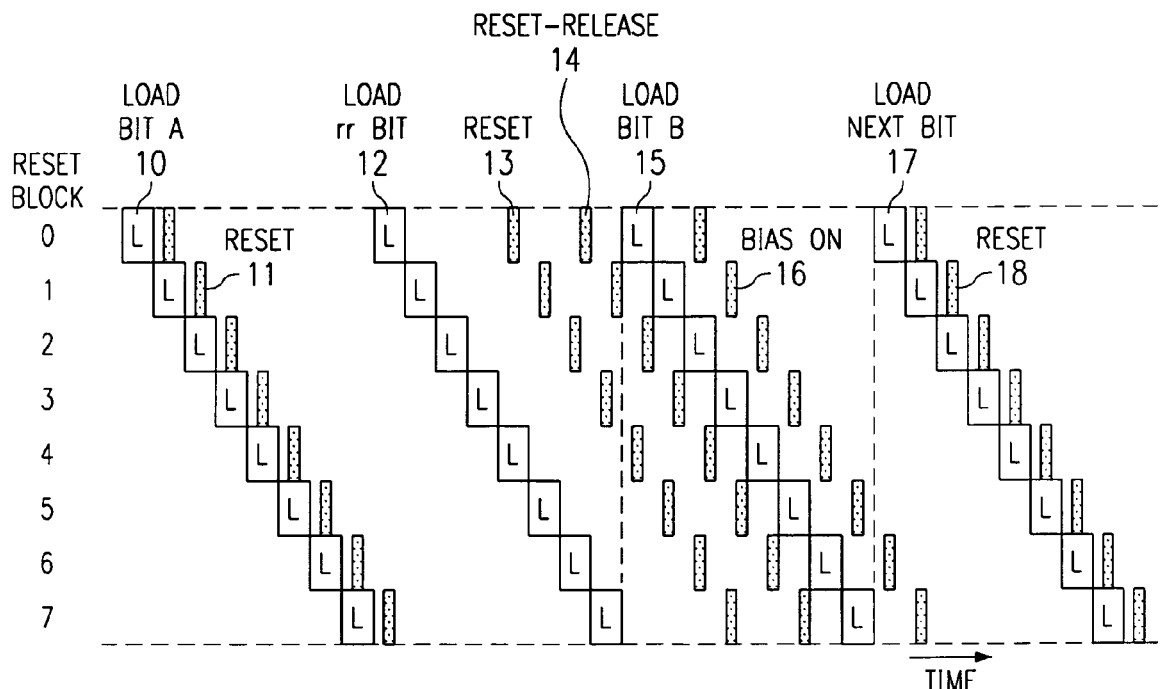
FIG. 1b is a timing diagram further illustrating the reset-release clocking method of operating a DMD. (prior art)
Figure 2A:
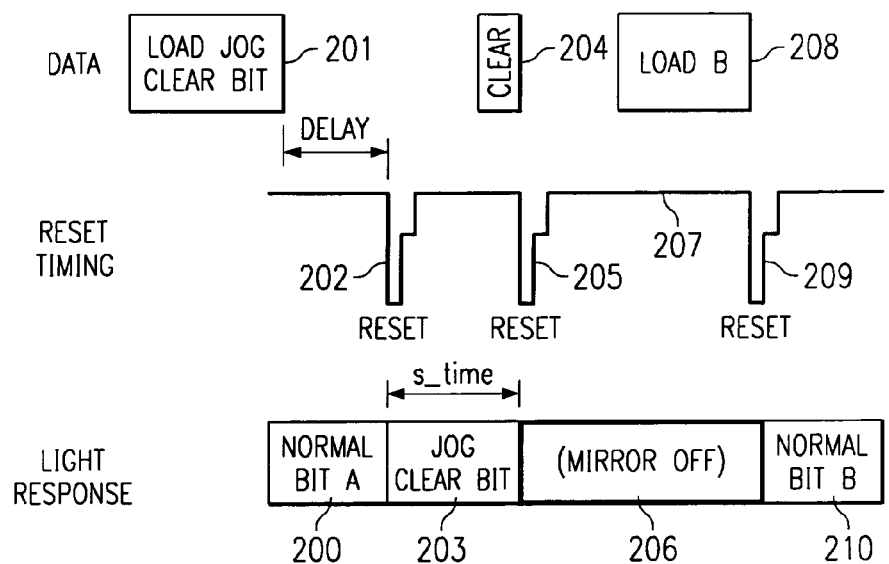
FIG. 2a is a diagram showing a phased DMD operated with the jog-clear clocking method where the mirrors in each block are quickly cleared to the dark state in a phased manner. (referenced application)
Figure 3:
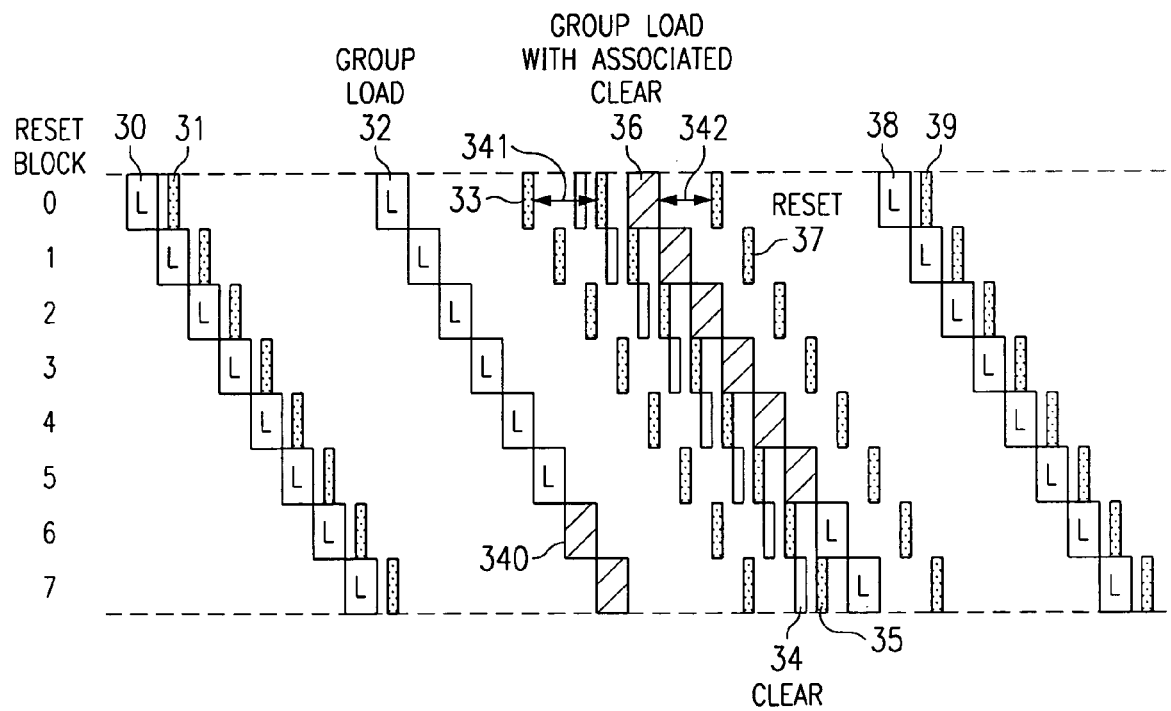
FIG. 3 is a timing diagram for the embedded block, fast clear timing method of the present invention.
Figure 2B:
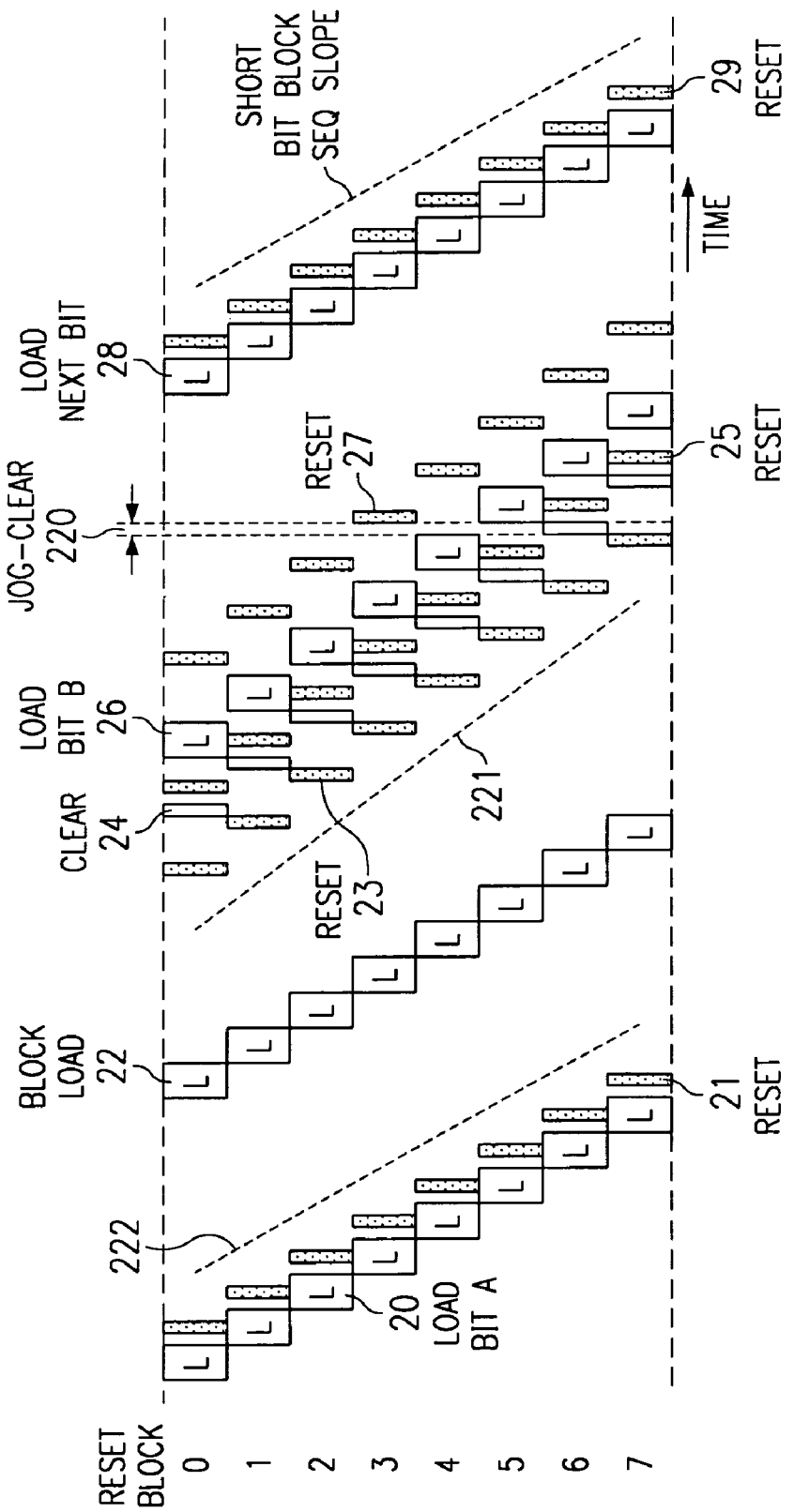
FIG. 2b is a timing diagram further illustrating the jog-clear clocking method of operating a DMD. (referenced application)

FIG. 3 is a timing diagram for the fast-clear method. The diagram shows a normal bit being loaded 30 and immediately reset 31, then the data for a lower-significant short-bit is loaded 32 but not immediately reset in the normal fashion. Then at the appropriate time the short-bit data is reset 33, setting the mirrors to their short-bit state. Next, the clear function is applied to terminate the short-bit at the appropriate time; i.e., the clear data is loaded 34 and the device is reset 35 at exactly the right time to provide the short-bit period 341, which is properly aligned with the associated load of block 6 340. In other words, block load 6 340 is associated with the fast-clear of block 0 34. When the clear-reset 35 is applied, the mirror bias is still applied so that the mirrors are turned OFF (dark) while the next normal load 36 occurs. Then there is another fixed delay 342 before the SLM is reset 37 with the data from the next normal data load. Finally, the process continues with normal data loads 38 and immediate resets 39. Notice in this diagram that the time between loads remains constant right through the fast-clear bit so that any skew in the timing diagram is avoided.

Figure 4:
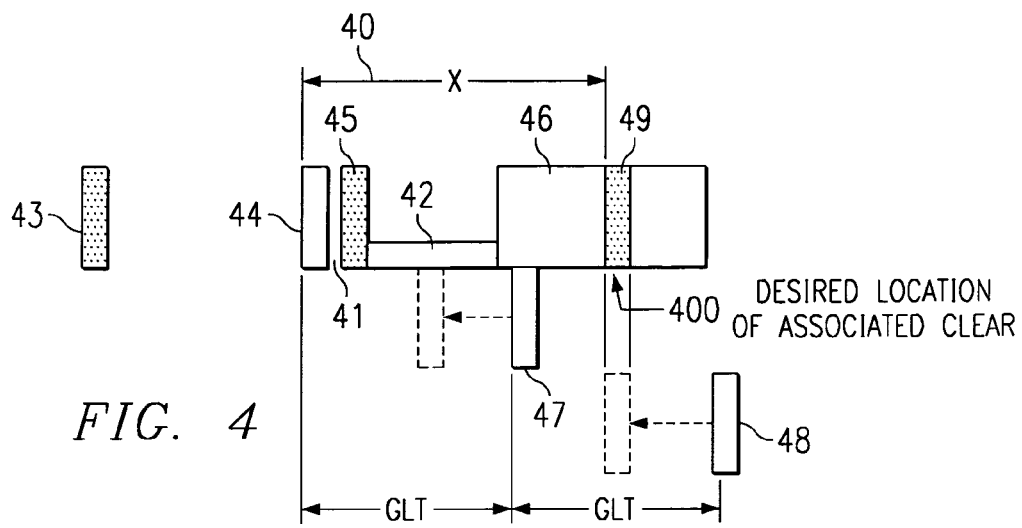
FIG. 4 is a diagram illustrating how the fast-clear span is determined in the method of the present invention.

FIG. 4 is a diagram illustrating how to determine the fast-clear minimum span ($FCS_{min}$); the fixed number of blocks between a clear and its associated block load. The Figure shows the short-bit load reset 43, the fast-clear load 44 and reset 45, and the next normal-bit load 46. The minimum time between the fast-clear load 44 and reset 45 is designated as the data setup time (DSU) 41. The minimum time between the short bit reset 45 and the start of the next normal-bit load 46 is designated as fast-clear data hold (FCDataHold) 42 time, where the DMD mirrors settle and remain in the OFF state. Finally, the desired delay time into the load where the associated clear occurs 400 is designated the fast-clear associated delay (FCAssocDelay) 46. Also shown are the fast-clear pulses 47–48 for the next two reset blocks and their desire location to provide the fast-clear minimum span for the present invention.

The fast-clear minimum span is determined as $FCS_{min}=(X/GLT)$ rounded to the next greater integer, where:
X 40=CLR+DSU+RST+FCDataHold+FCAssocDelay, and
GLT is the block load time, which is also the time difference between consecutive blocks.

In the example shown, $FCS_{min}$ is integer 2 as illustrated by the fast-clear 48, associated with data load 46 two blocks ahead, being aligned in the middle 49 of data load 46. This is also illustrated in FIG. 3 where the associated load always occurs two blocks before a given fast clear.

Figure 5:
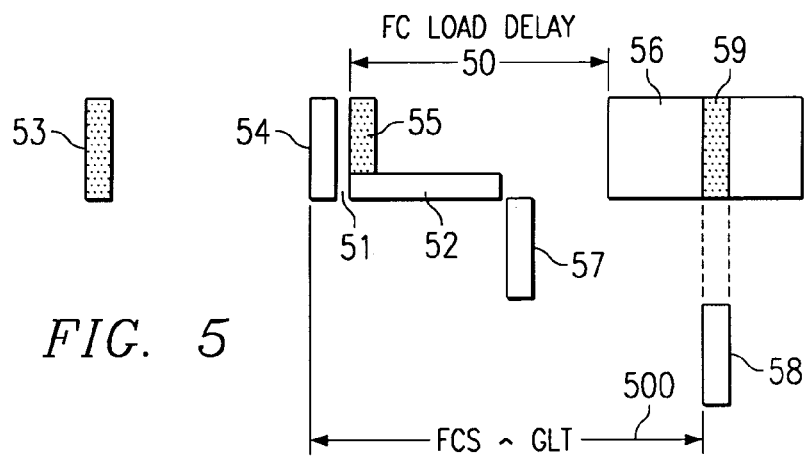
FIG. 5 is a diagram illustrating how the fast-clear load delay is determined in the method of the present invention.

FIG. 5 is a diagram illustrating how to determine the fast-clear load delay (FCLoadDelay) 50; how much time it is from the start of the fast-clear reset 55 to start the of the normal load 56. This delay determines where all data loads should occur in the timing sequence. The figure shows the short-bit load reset 53, the fast-clear load 54 and reset 55, and the next normal-bit load 56. Also shown are the DSU 51 and FCDataHold 52 times, as described earlier, and the fast-clear pulses 57–58 in the desired locations for the next two reset blocks. Once the $FCS_{min}$ is known (as determined above), the fixed time between fast-clear pulses ΔFC 500 can be determined as:

$\Delta FC=FCS_{min}*GLT$ and the FCLoadDelay is given as $FCLoadDelay=\Delta FC-FCAssocDelay-CLR-DSU$.

Notice in this diagram that the fast-clear 58 aligns in the desired location in the middle area 59 of its associated block 56 from two blocks above.

Figure 6:
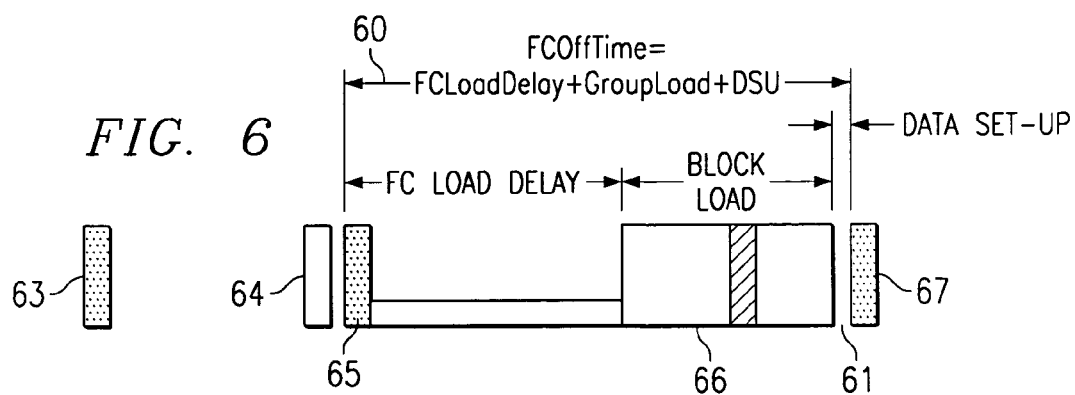
FIG. 6 is a diagram illustrating how the fast-clear off time is determined in the method of the present invention.

FIG. 6 is a diagram illustrating how to determine the fast-clear off time (FCOffTime) 60; the minimum delay from the start of the fast-clear reset 65 to the start of the next normal reset 67. The figure shows the short-bit load reset 63, the fast-clear load 64 and reset 65, the data set-up time 61, the next normal-bit block load (BlockLoad) 66 and reset 67. The fast-clear off time is given as:

$FCOffTime=FCLoadDelay+GLT+DSU$, where FCLoadDelay is defined above in FIG. 5 and DSU is the data setup time 61 after loading the next normal bit 66. The fast-clear off time has to be taken out of the frame time and therefore needs to be minimized. The actual OFF time may be lengthened by the reset conflict resolution algorithm.

Figure 7:
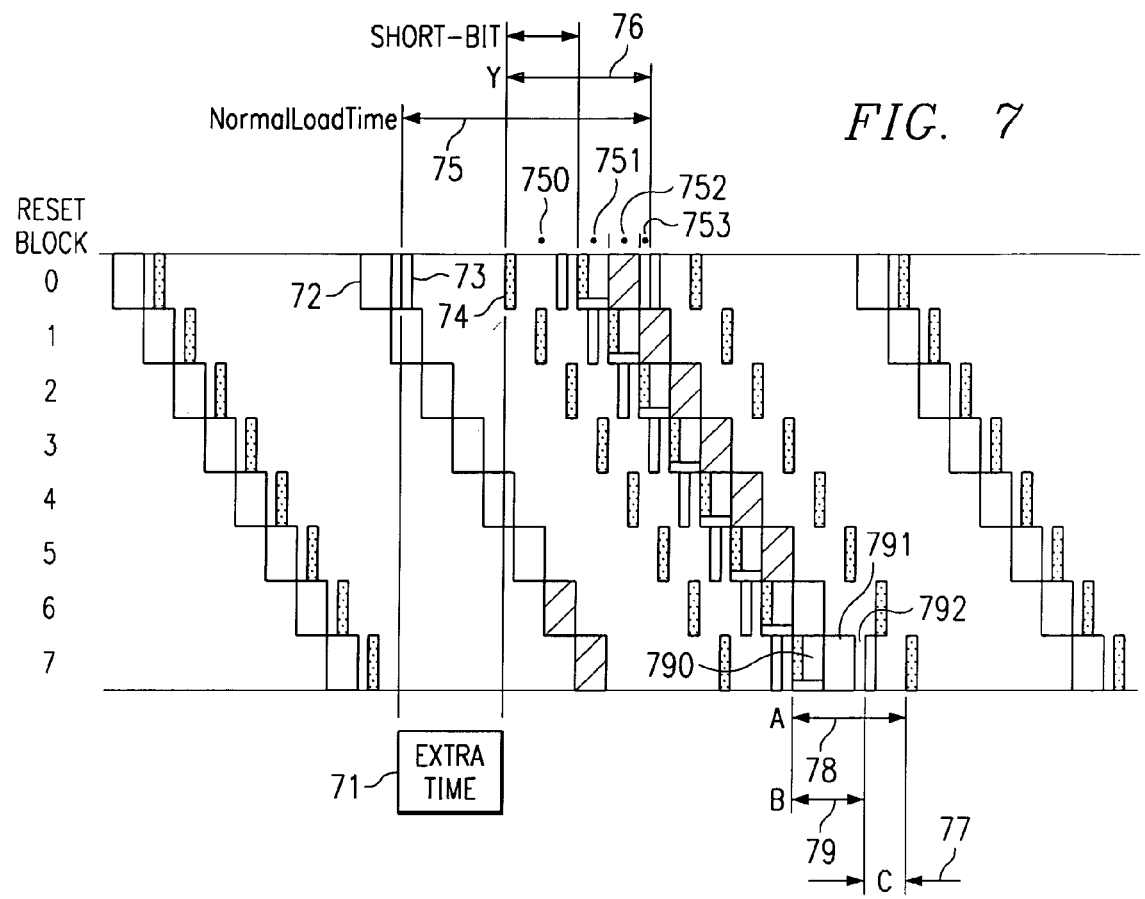
FIG. 7 is a diagram illustrating how extra time is added when the next segment involves the fast-clear method of this invention.

The actual off time following a fast clear bit must sometimes be extended to be more than the calculated FCOffTime in order to resolve reset conflicts. While it is advantageous to keep the off time as small as possible for best efficiency, the off time can be extended without affecting bit linearity. When the actual off time is set to be more than FCOffTime, the succeeding normal bit can be made shorter than the time that would ordinarily be required for a normal bit. Shortening the succeeding bit has the advantage of giving more flexibility to the overall PWM sequence design. FIG. 7 illustrates this effect on the succeeding normal bit. The length of the next normal bit can be reduced by as much as the amount C 77, with $C\ 77=A\ 78-B\ 79$, where
A 78=actual off time after adjustments for reset conflict resolution, and
B 79=FCOffTime.

In the method of the present invention, the bit preceding the short-bit 70 is extended (extra time added) over the time of a normal bit to accommodate for the following short-bit. FIG. 7 illustrates how to determine the amount of extra time required when the next segment is the fast-clear (short) bit. This extra time 71, the hold time between when the load data 72 is normally reset 73 and actually reset 74 leading into the short-bit, is determine as Extra Time 71=NormalLoadTime 75–Y 76, where:

Y=short-bit_time  750+FCLoadDelay  751+GLT 752+DSU 753.

Figure 8A:
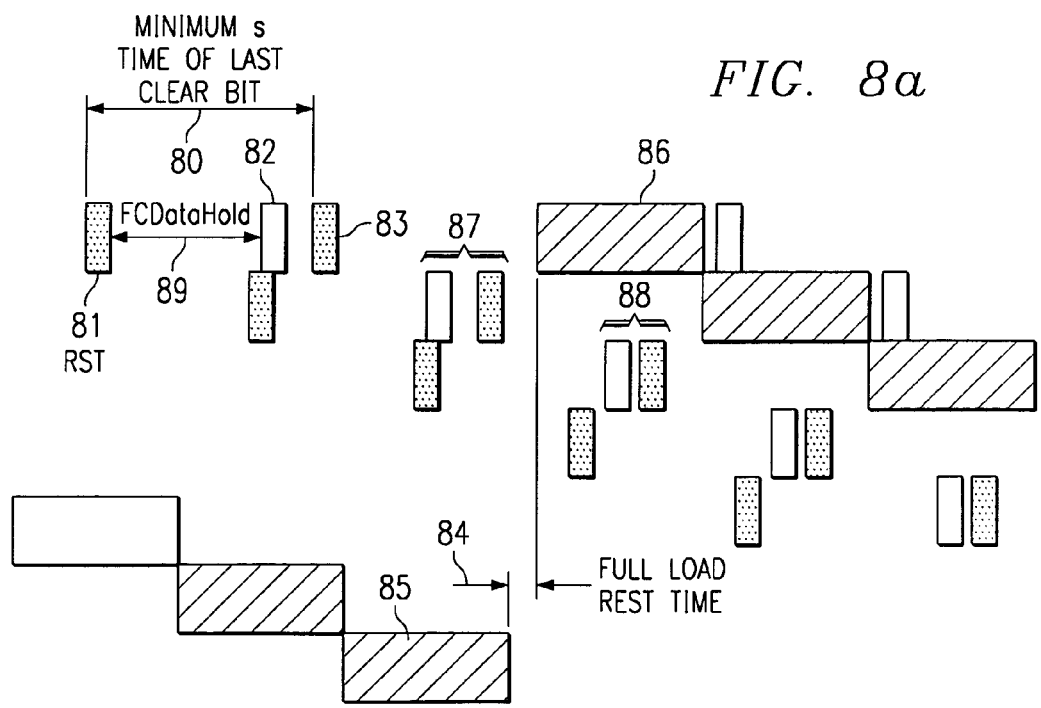
FIG. 8a is a diagram illustrating the effect of full-load rest time on the fast clear bit used in the method of the present invention.

In the method of this invention, the fast-clear pulse must always align exactly at the same location relative to its associated load. In some cases, as shown in FIG. 8a, the system can impose a delay between loads of the last block 85 and the first block 86 of full device loads, where a full load rest time 84 (gap) is introduced. The minimum short-bit time 80 is the lapsed time from when the DMD mirrors are reset 81 with the short-bit data until clear data is loaded 82 and the mirrors are reset 83 to the OFF state. This system imposed full load rest time can affect the minimum fast-clear bit in that the position of the fast clear pulse 82, within the bit segment, changes based on whether it occurs before 87 or after 88 the full load rest time 84. To accommodate the full_load_rest time, the minimum short-bit time must account for the change in relative position of the clear pulse. As shown in FIG. 8a, the full_load_rest time has the same effect as increasing the clear pulse time by that amount. The minimum fast-clear bit time s is given by:

S=RST  81+FCDataHold  89+CLR 82+Full_Load_Rest time 84+DSU.

Figure 8B:
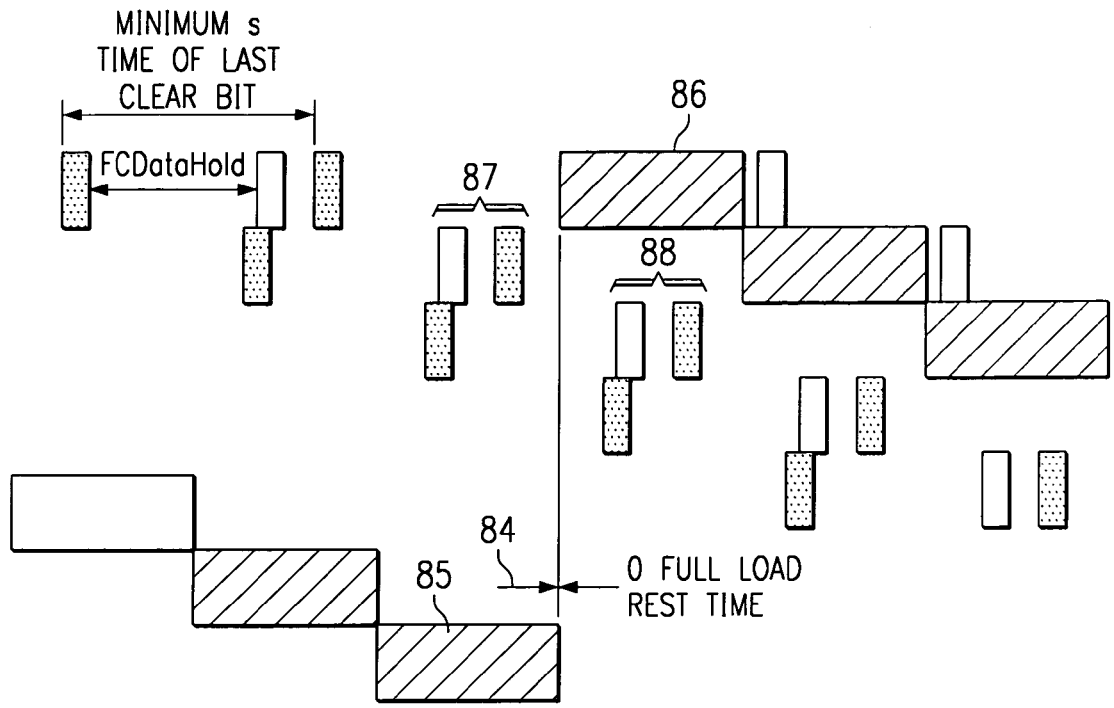
FIG. 8b is a diagram illustrating the effect of zero full-load rest time on the fast clear bit used in the method of the present invention.

FIG. 8b shows the case where the system does not impose any full_load rest time; the full load rest time 84 is zero. Here the short-bit block 7 85 and block 0 86 line up with zero gap 84 and the positioning of the fast clear bit remains constant before 87 and after 88 the block 7 85 and block 0 86 transition time.

The method of the present invention, which generates bits shorter than the display element settling and reload times with minimum loss of brightness and no loss of data bandwidth, using block clears embedded within the loads of other blocks, is summarized as follows:

(1) Adjusting preceding and succeeding bit segment lengths such that the DMDs embedded clears occur at exactly the same time within their associated block loads, (2) accommodating the full_load_rest time (as defined in the FIG. 8a discussion above), which allows for the determination of the minimum fast-clear bit length, (3) determining the FCSmin (as defined in the FIG. 4 discussion above), which is an integer representing the constant difference between each fast-clear block and that of associated block loads, (4) determining the FC_Load_Delay time (as defined in the FIG. 5 discussion above), which is the amount of time from the start of the fast-clear reset to the start of the normal load, (5) calculating the minimum off_time (as defined in the FIG. 6 above), which is the minimum delay time from the start of the fast-clear reset to the start of the next normal reset, (6) determining the amount of extra_time (as defined in the FIG. 7 discussion above) that may be required for preceding bits, and (7) determining the amount of time the succeeding bit can be reduced from the normal bit time to satisfy possible system imposed requirements.

Figure 9:
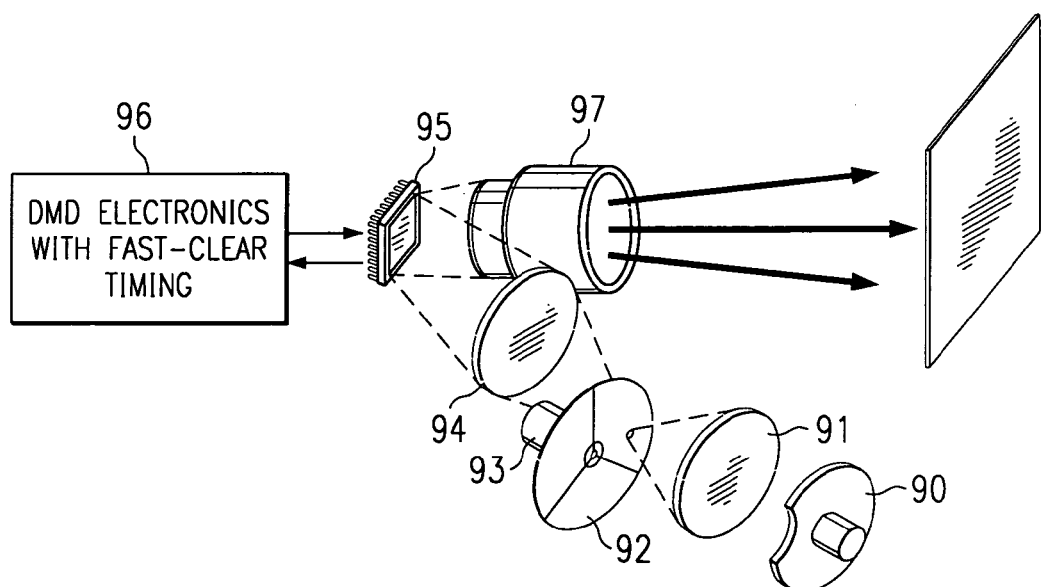
FIG. 9 is a block diagram of a single-chip, color field-sequential, DMD projector operated with the fast-clear timing method of this invention.

FIG. 9 is an example of a single-DMD projection display, which uses the fast-clear method of the present invention to provide a brighter picture with far less artifacts. The system is comprised of a light source 90 coupled to a first condenser lens assembly 91, optically coupled to a color wheel 92 and motor 93 assembly, optically coupled to a secondary condenser lens assembly 94, optically coupled to a SLM 95, which is controlled by electronics 96 that among other operations performs the fast-clear operation of the present invention, optically coupled to a projection lens assembly 97, and finally optically coupled to a viewing screen 98.

In operation, light from a light source is directed along a first optical path, through color optics, to produce sequential R-G-B color light beams, which are focused on the surface of the SLM. The fast-clear timing electronics of the present invention controls the DMD mirrors with improved efficiency and without undesirable venetian blind boundary artifacts, and directs the modulated light from the SLM along a second optical path on to a viewing screen.

The method of the present invention positions the timing events to:

(1) use the available input bandwidth so as not to have gaps between block loads, (2) minimize the mirror off time to avoid degrading system brightness, and (3) provide as short a least-significant-bit (short-bit) as possible for improved resolution.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A method of operating a spatial light modulator, the method comprising:
    loading a first bit of display data into a first block of spatial light modulator elements;
    resetting said first block of spatial light modulator elements to display said first bit of display data;
    loading a lower-significance bit of display data into said first block of spatial light modulator elements;
    resetting said first block of spatial light modulator elements to display said lower-significance bit of display data;
    loading clear data in said first block of spatial light modulator elements while simultaneously loading display data into a second block of spatial light modulator elements; and
    resetting said first block of spatial light modulator elements to a dark state at the end of a display period corresponding to said lower-significance bit.

2. The method of claim 1 comprising:
    delaying the loading of a second associated block of data by an amount corresponding to a minimum number of said spatial light modulator blocks following said step of resetting said spatial light modulator elements to a dark state.

3. The method of claim 1, wherein the display period of said first bit is extended to accommodate said lower-significance bit.

4. The method of claim 1 comprising:
    delaying the display of a bit following said bit of less-significance to achieve a minimum off time.

5. The method of claim 4, wherein said minimum off time is further extended to avoid reset conflicts.

6. The method of claim 5, wherein a display period of said bit following said bit of less-significance is shortened by an amount of time corresponding to said further extended time.

7. A projection display comprising:
    a light source for producing a beam of light along a first light path;
    light-condensing optics in said first light path for focusing said beam of light on to the surface of a spatial light modulator;
    control electronics for receiving image data and providing control signals and display data representing said image data;
    said spatial light modulator in said first light path for receiving said control signals and said display data and for selectively modulating said beam of light in response to display data, said spatial light modulator comprised of an array of modulator elements, said modulator elements grouped into at least two blocks;
    a projection lens focusing said modulated light from said spatial light modulator onto an image plane; and
    said control electronics operable to:
    load the first bit of display data in a first of said blocks, reset said first of said blocks to display loaded data, load clear data in said first block while simultaneously loading display data into another block, and reset said first block to a dark state; and
    sequentially load the first bit of display data into remaining data blocks, resetting each of said remaining blocks to sequentially display loaded data, loading clear data into each of said remaining blocks while simultaneously loading display data into another block, and resetting each of said remaining blocks to a dark state.

8. A method of operating a spatial light modulator, the method comprising:
    loading a first bit of display data into a first block of spatial light modulator elements;
    resetting said first block of spatial light modulator elements to display said first bit of display data;
    loading clear data in said first block of spatial light modulator elements while simultaneously loading display data into a second block of spatial light modulator elements; and
    resetting said first block of spatial light modulator elements to a dark state at the end of a display period corresponding to said first bit.

9. The method of claim 8 comprising:
    delaying the loading of a second associated block of data by an amount corresponding to a minimum number of said spatial light modulator blocks following said step of resetting said spatial light modulator elements to a dark state.

10. The method of claim 8, wherein the display period of a previous bit is extended to accommodate said first bit.

11. The method of claim 8 comprising
    delaying the display of a bit following said first bit to achieve a minimum off time.

12. The method of claim 11, wherein said minimum off time is further extended to avoid reset conflicts.

13. The method of claim 12, wherein a display period of said bit following said first bit is shortened by an amount of time corresponding to said further extended time.

* * * * *